(12) United States Patent
Sugitani et al.

(10) Patent No.: US 6,633,291 B1
(45) Date of Patent: Oct. 14, 2003

(54) METHOD AND APPARATUS FOR DISPLAYING AN IMAGE

(75) Inventors: Hirofumi Sugitani, Kawasaki (JP); Yoshihito Tanaka, Kawasaki (JP); Masaaki Yoshikawa, Takamatsu (JP); Satoshi Ohtake, Kawasaki (JP); Noritsune Sekiguchi, Shiga (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/516,208

(22) Filed: Feb. 29, 2000

(30) Foreign Application Priority Data

Mar. 2, 1999 (JP) ............................................. 11-054185

(51) Int. Cl.$^7$ .......................... G06T 15/10; G06T 15/20
(52) U.S. Cl. ........................ 345/427; 345/630; 345/634
(58) Field of Search ........................ 707/527; 345/419, 345/427, 630, 632, 633, 634

(56) References Cited

U.S. PATENT DOCUMENTS 5,930,769 A * 7/1999 Rose .......................... 345/419
5,991,783 A * 11/1999 Popa et al. .................. 707/522
5,995,108 A * 11/1999 Isobe et al. .................... 227/86
6,144,388 A * 11/2000 Bornstein ..................... 345/629

* cited by examiner

Primary Examiner—Mark Zimmerman
(74) Attorney, Agent, or Firm—Staas & Halsey LLP

(57) ABSTRACT

A three-dimensional shape model indicating a first part is constructed and a three-dimensional shape that works as a transparent screen is disposed thereon continuously. A sight line direction is set and the three-dimensional shape model is displayed after rotated in accordance with the set sight line direction. A first two-dimensional image is constructed in accordance with the sight line direction, and a second two-dimensional image is constructed. The first two-dimensional image and the second two-dimensional image are combined with each other so as to construct a combined two-dimensional image. The combined two-dimensional image is assigned so that the part thereof corresponding to the first two-dimensional image agrees with the three-dimensional shape model, and the combined two-dimensional image is displayed visually.

11 Claims, 4 Drawing Sheets

Fig. 2

```
START
  │
  ▼ SP1
DIVIDE A WHOLE HUMAN BODY INTO A FIRST PART INDICATING THE BODY UNDER
THE NECK AND A SECOND PART INDICATING THE HEAD OR THE FACE
  │
  ▼ SP2
CONSTRUCT A 3-DIMENSIONAL SHAPE MODEL SUCH AS A WIRE FRAME MODEL FROM
THE DATA INDICATING THE FIRST PART, AND DISPOSE A 3-DIMENSIONAL FRAME
SHAPE WORKING AS A TRANSPARENT SCREEN THEREON CONTINUOUSLY TO THIS
3-DIMENSIONAL SHAPE MODEL
  │
  ▼ SP3
OBTAIN PLURAL 2-DIMENSIONAL IMAGE DATA BY SHOOTING ALL-AROUND OF THE
HEAD
  │
  ▼ SP4
SET A SIGHT LINE DIRECTION
  │
  ▼ SP5
DISPLAY THE 3-DIMENSIONAL SHAPE MODEL AFTER ROTATING IT IN ACCORDANCE
WITH THE SET SIGHT LINE DIRECTION
  │
  ▼ SP6
CORRESPOND TO THE SHAPE OF THE ROTATED AND DISPLAYED 3-DIMENSIONAL
SHAPE MODEL PROJECTED ON THE 2-DIMENSIONAL PLANE
  │
  ▼ SP7
CONSTRUCT THE SECOND 2-DIMENSIONAL IMAGE THAT CORRESPONDS TO THE SET
SIGHT LINE DIRECTION OR IS THE NEAREST
  │
  ▼ SP8
COMBINE THE FIRST 2-DIMENSIONAL IMAGE WITH THE SECOND 2-DIMENSIONAL
IMAGE AND CONSTRUCT THE COMBINED 2-DIMENSIONAL IMAGE
  │
  ▼ SP9
ASSIGN THE COMBINED 2-DIMENSIONAL IMAGE SO THAT THE PART OF THE
COMBINED 2-DIMENSIONAL IMAGE CORRESPONDING TO THE FIRST 2-DIMENSIONAL
IMAGE AGREES WITH THE 3-DIMENSIONAL SHAPE MODEL
  │
  ▼ SP10
DISPLAY THE COMBINED 2-DIMENSIONAL IMAGE VISUALLY
  │
  ▼
END
```

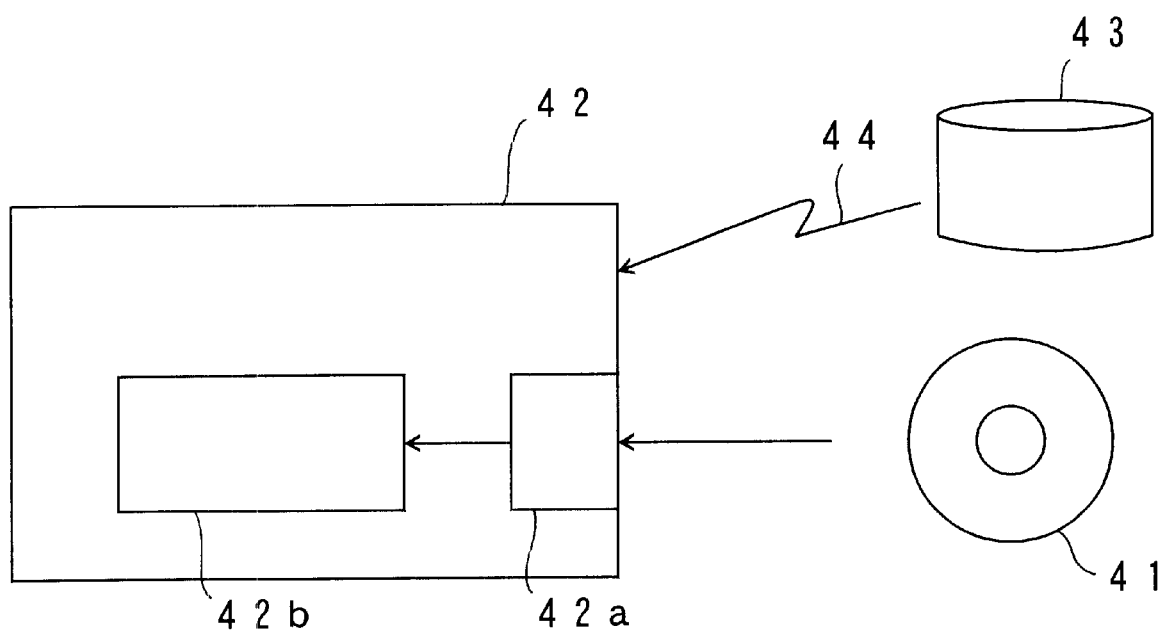

METHOD AND APPARATUS FOR DISPLAYING AN IMAGE

BACKGROUND OF THE INVENTION

1. Field of the Invention

The present invention relates to a method and an apparatus for displaying an image. More specifically, the present invention relates to a method and an apparatus for displaying a computer simulation image of trying on clothes.

The present invention also relates to a recording medium storing a program for a computer to perform the display of the computer simulation image.

If a customer of a tailor or a boutique can see a computer simulation image of herself or himself wearing a cloth selected by the customer, the customer service will be improved. In such a simulation system, it is desirable to display the image as a three-dimensional computer graphic (3-D CG) image in which the fitting sense of the selected cloth is adapted to the proportion and the face of the customer.

2. Description of the Prior Art

Conventionally, in the computer graphics field, some methods of displaying an object while rotating the object in the three-dimensional space are known. One of the methods that is used widely for various applications generates three-dimensional modeling (polygon) data and uses the data for displaying a three-dimensional object.

If the above-mentioned method is adopted, three-dimensional modeling data are generated in advance. The object can be displayed while being rotated. The image of the object viewed from any direction can be displayed with certain image quality depending on the modeling.

However, in order to use the above-mentioned method, the three-dimensional modeling data indicating the object should be generated in advance. Therefore, the data generating process becomes very complicated. In addition, generation of the three-dimensional modeling data can be very difficult depending on the shape of the object. Particularly, in order to improve the display quality of the object, the three-dimensional modeling becomes complicated, resulting in further complicated process of modeling.

A system for automatically generating the three-dimensional modeling data by using a three-dimensional scanner is proposed for improving the above-mentioned inconvenience. However, such a system is still expensive, and has many restrictions on performance of automatically generating the three-dimensional modeling data (such as a restriction of lighting or a background). In addition, an object to which the system can be applied is also limited. The system cannot be applied to a human head that requires a fine expression for hairs, for example.

SUMMARY OF THE INVENTION

The object of the present invention is to provide a method and an apparatus that can achieve a display of a whole body by using three-dimensional data only for a shape of a part of the object and by using two-dimensional image for the other part so as to combine the two-dimensional image with the three-dimensional shape data and so that the visible data with the same quality as the case where the whole body is displayed by the three-dimensional data.

Another object of the present invention is to provide a method that enables the fitting simulation display substantially in the three-dimensional form with a little data quantity.

According to a first aspect of the present invention, a method for displaying an image of an object including a first part and a second part is provided. The first part corresponds to a body under neck of a human, while the second part corresponds to a head (face), for example. The method comprises the steps of constructing a three-dimensional shape model by modeling a shape of the first part of the object in a virtual three-dimensional space, constructing a two-dimensional image of the first part of the object in accordance with the three-dimensional shape model when viewing the object from a predetermined direction, constructing a two-dimensional image of the second part of the object when viewing the object from the predetermined direction, combining the two-dimensional image of the first part with the two-dimensional image of the second part so as to generate a combined two-dimensional image of the first and the second parts, and assigning the combined two-dimensional image to the three-dimensional shape model.

Thus, an image of an object with a high quality can be obtained by modeling only the shape of the first part of the object into the three-dimensional space and by assigning the combined two-dimensional image to the three-dimensional shape model. Accordingly, even if the three-dimensional shape model is simplified, the object can be displayed with high quality by making the two-dimensional image with high quality, and the process for generating data can be simplified. Even if the object is difficult to make the three-dimensional shape by the present technology, it can be easily three-dimensionalized. In addition, since the complex object having a lot of potential data quantity of the three-dimensional shape can be displayed by using the three-dimensional shape model indicating the shape and the two-dimensional image, the data quantity can be substantially reduced with little deterioration of quality.

According to a second aspect of the present invention, the method further comprises a displaying step of generating a plurality of combined two-dimensional images of the first and the second parts of the object from a plurality of directions in accordance with designation of direction designating means for designating the predetermined direction, and displaying one of the plural combined two-dimensional images selectively.

According to a third aspect of the present invention, the displaying step includes a step of displaying the plural combined two-dimensional images sequentially and continuously.

According to a fourth aspect of the present invention, an apparatus for displaying an image of an object including a first part and a second part is provided. The apparatus comprises means for constructing a three-dimensional shape model by modeling a shape of the first part of the object in a virtual three-dimensional space, means for constructing a two-dimensional image of the first part of the object in accordance with the three-dimensional shape model when viewing the object from a predetermined direction, means for constructing a two-dimensional image of the second part of the object when viewing the object from the predetermined direction, means for combining the two-dimensional image of the first part with the two-dimensional image of the second part so as to generate a combined two-dimensional image of the first and the second parts, and means for assigning the combined two-dimensional image to the three-dimensional shape model.

According to a fifth aspect of the present invention, an apparatus further comprises direction designating means for designating the predetermined direction, and displaying means for generating a plurality of combined two-dimensional images of the first and the second parts of the object from a plurality of directions in accordance with designation of the direction designating means and displaying one of the plural combined two-dimensional images selectively.

According to a sixth aspect of the present invention, the displaying means display the plural combined two-dimensional images sequentially and continuously.

According to a seventh aspect of the present invention, a computer-readable recording medium is provided. The recording medium stores a program for a computer to perform the method that comprises the steps of constructing a three-dimensional shape model by modeling a shape of a first part of the object in a virtual three-dimensional space, constructing a two-dimensional image of the first part of the object in accordance with the three-dimensional shape model when viewing the object from a predetermined direction, constructing a two-dimensional image of a second part of the object when viewing the object from the predetermined direction, combining the two-dimensional image of the first part with the two-dimensional image of the second part so as to generate a combined two-dimensional image of the first and the second parts, and assigning the combined two-dimensional image to the three-dimensional shape model.

According to an eighth aspect of the present invention, a method for displaying a computer simulation image is provided. The method comprises the steps of displaying a three-dimensional image on a display screen, the three-dimensional image being based on memorized three-dimensional data corresponding to a human body under neck, displaying a two-dimensional image on a display screen, the two-dimensional image being based on data of a head portrait shot as a photograph, and combining the three-dimensional image of the body under neck with the two-dimensional image of the head portrait so as to display a whole body of the human by the combined image.

BRIEF DESCRIPTION OF THE DRAWINGS

FIG. 2 is a flowchart showing an embodiment of a method for displaying an image according to the present invention.

FIG. 4 shows a configuration of a computer system that performs the method of the present invention for displaying the image in accordance with a program stored in a recording medium.

DESCRIPTION OF THE PREFERRED EMBODIMENTS

Hereinafter, embodiments of the present invention will be explained in detail with reference to the attached drawings.

Figure 1:
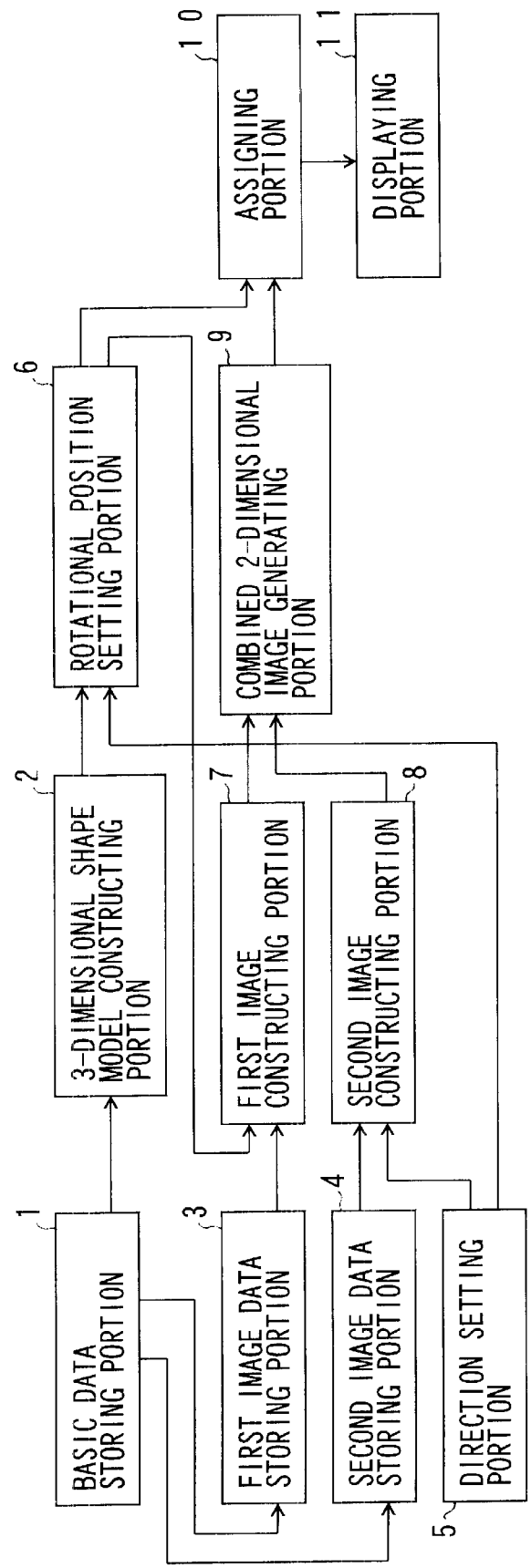
FIG. 1 is a block diagram showing an embodiment of an image displaying apparatus according to the present invention.

FIG. 1 is a block diagram showing an embodiment of an image displaying apparatus according to the present invention. Each function of each part in this block diagram can be realized by using hardware of a computer including a memory, a processor and a controller, and software thereof.

This image displaying apparatus includes a basic data storing portion 1, a three-dimensional shape model constructing portion 2, a first image data storing portion 3, a second image data storing portion 4, a direction setting portion 5, a rotational position setting portion 6, a first image constructing portion 7, a second image constructing portion 8, a combined two-dimensional image generating portion 9, an assigning portion 10 and a displaying portion 11.

The basic data storing portion 1 stores a basic data indicating a shape of the object, which is divided into a first part and a second part.

The three-dimensional shape model constructing portion 2 constructs the three-dimensional shape model of the first part such as a wire frame model in accordance with a first basic data corresponding to the first part.

The first image data storing portion 3 stores first image data corresponding to the first part.

The second image data storing portion 4 stores second image data corresponding to the second part.

The direction setting portion 5 sets a sight line direction (a predetermined direction) toward the object.

The rotational position setting portion 6 sets a rotational position of the three-dimensional shape model in accordance with the set sight line direction.

The first image constructing portion 7 reads the first image out of the first image data storing portion 3 and constructs the first two-dimensional image adapted to the plane shape of the three-dimensional shape model accompanied by the set rotational position.

The second image constructing portion 8 reads the second image data out of the second image data storing portion 4 and constructs the second two-dimensional image corresponding to the set sight line direction.

The combined two-dimensional image generating portion 9 combines the constructed first two-dimensional image and the second two-dimensional image so as to generate a combined two-dimensional image.

The assigning portion 10 assigns the first two-dimensional image part of the combined two-dimensional image to the three-dimensional shape model.

The displaying portion 11 displays the assigned combined two-dimensional image visually.

The language "constructing" means loading a memory of a computer with a model in a form that can be operated by the computer, and includes a reception of an input by an operator and a load of data from other memory such as an external drive. It also includes a calculation for generating a model in accordance with data such as a separate parameter file. In addition, it can include an import of image data from a camera or a scanner.

The two-dimensional image means image data having a two-dimensional extension in a space. It can be either a till picture or an animated picture.

The basic data storing portion 1 stores the shape of the object with dividing it into the first part and the second part, as necessary data for expressing the shape by a plane equation or a surface equation, for example. The object can be any of various objects having a three-dimensional shape such as a human body. In the case of a human body, for example, the part under head is the first part and the remainder (head) is the second part. The image data of the second part, i.e., the head is obtained by, for example, a digital camera (not shown) having a CCD as an imaging device, and is inputted into the basic data storing portion 1.

The three-dimensional model construction portion 2 constructs the three-dimensional shape model (e.g., a wire frame model) consisting of data for calculation including three-dimensional coordinates of positions of the first part in the virtual three-dimensional space in accordance with the basic data indicating the shape of the first part.

The first image data storing portion 3 stores the two-dimensional image data to be processed for the entire surface of the first part and data indicating the relationship to each position of the three-dimensional shape model.

The second image data storing portion 4 stores plural sets of the two-dimensional image data corresponding to plural pictures of head (or face) of a human shot from plural directions by using a digital camera and data of the direction (sight line direction) corresponding to each image data.

The direction setting portion 5 sets a sight line direction toward the first part by a numerical input, a selection of the rotational direction and a selection continuing period.

The rotational position setting portion 6 performs a rotation process on the three-dimensional shape model so as to meet the sight line direction set by the direction setting portion 5, for example.

The first image constructing portion 7 constructs the first two-dimensional image to be assigned to a start point of the three-dimensional shape model rotationally processed by the rotational position setting portion 6. Specifically, the first image constructing portion 7 constructs the first two-dimensional image by extracting positions located at the view point side of the three-dimensional shape model, by extracting the two-dimensional image data in the area corresponding to the extracted positions, and by deforming at least a part of the extracted two-dimensional image data.

The second image constructing portion 8 constructs the second two-dimensional image corresponding to the first two-dimensional image by selecting one of the two-dimensional image data stored in the second image data storing portion 4, which corresponds to the set sight line direction.

The combined two-dimensional image generating portion 9 combines the first two-dimensional image with the second two-dimensional image so that the first part and the second part of the object satisfy the relative position to each other. In the case where the first part is the body under the neck and the second part is the head (face), the first two-dimensional image and the second two-dimensional image are combined with each other so that the axis of the first two-dimensional image and the axis of the second two-dimensional image are aligned. Thus, the both two-dimensional images are combined naturally with each other.

The assigning portion 10 assigns a part of the combined two-dimensional image corresponding to the first two-dimensional image to the three-dimensional shape model. This assignment is performed by pasting the entire area of the two-dimensional image not onto the surface of three-dimensional shape model but onto the plane including the nearest point of the three-dimensional shape model, for example.

The displaying portion 11 is a display device such as a CRT, VDT or an LCD for displaying the combined two-dimensional image.

Next, the actions of the image displaying apparatus shown in FIG. 1 will be explained with reference to the flowchart shown in FIG. 2. Hereinafter, the object is a whole body of a human as an example.

In the step SP1, the whole body of a human is divided into the first part indicating the body under the neck and the second part indicating the head or the face. In the step SP2, the three-dimensional shape model such as a wire frame model is constructed from the data indicating the first part, and a three-dimensional frame shape working as a transparent screen is disposed thereon continuously to this three-dimensional shape model. In the step SP3, plural two-dimensional image data obtained by shooting all-around of the head (e.g., 90 shots of image data at 4° pitch). In the step SP4, the sight line direction is set. In the step SP5, the three-dimensional shape model is displayed with rotation in accordance with the set sight line direction. In the step SP6, corresponding to the shape of the rotated and displayed three-dimensional shape model projected on the two-dimensional plane (a plane that is perpendicular to the sight line direction), the first two-dimensional image adapted to the plane shape is constructed. In the step SP7, the second two-dimensional image that corresponds to the set sight line direction or is the nearest is constructed. In the step SP8, the first two-dimensional image and the second two-dimensional image are combined with each other to construct the combined two-dimensional image. In the step SP9, the combined two-dimensional image is assigned so that the part of the combined two-dimensional image corresponding to the first two-dimensional image agrees with the three-dimensional shape model. In the step SP10, the combined two-dimensional image is displayed visually and the sequential process is finished.

Figure 3A:
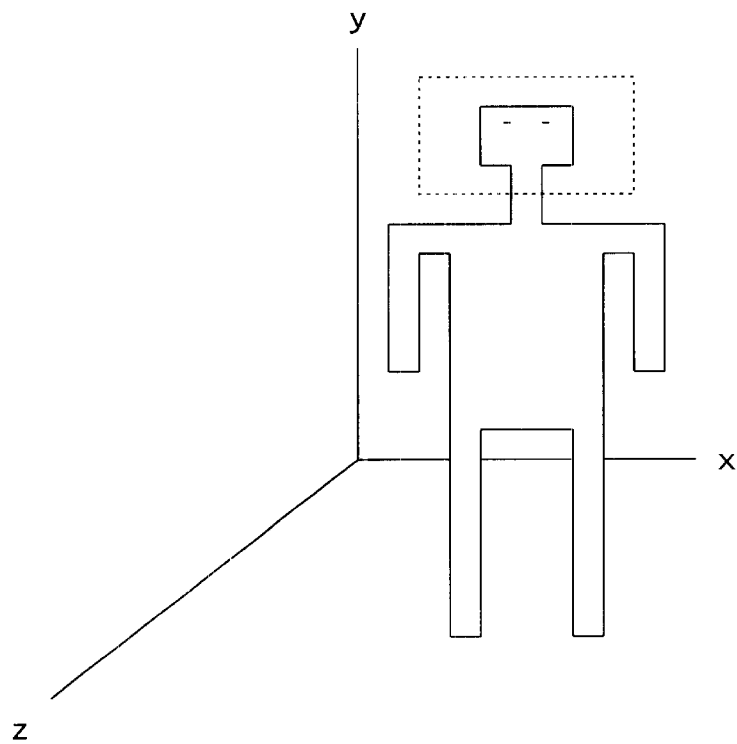
FIGS. 3A and 3B are diagrams for schematically explaining the case of displaying a whole body of a human visually.
Figure 3B:
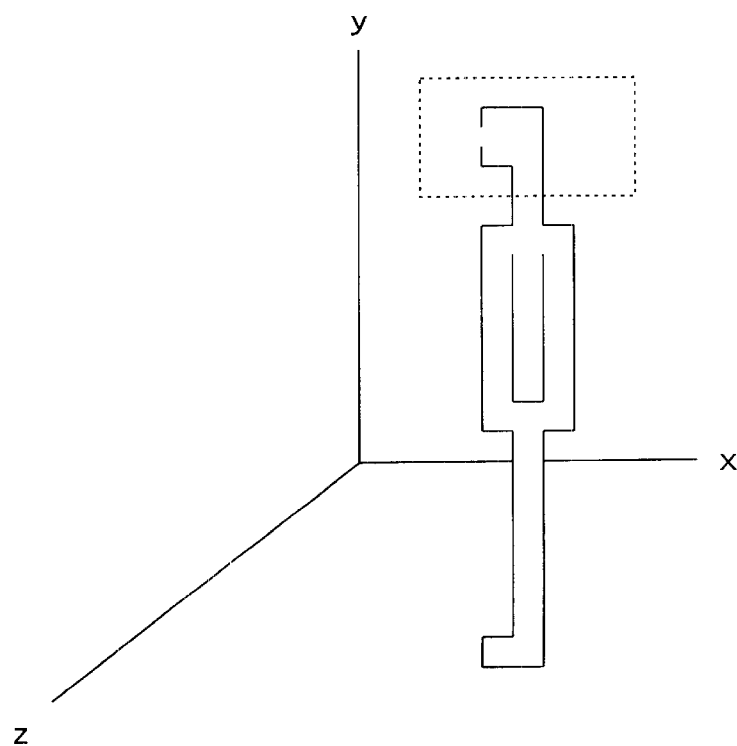

FIGS. 3A and 3B are diagrams for schematically explaining the method for displaying the image, or the case where the image displaying apparatus displays the human body visually. In this figure, the three-dimensional shape that works as a transparent screen is shown by the broken line. Using this rectangular transparent screen, an image of the head or the face that agrees with the direction of the body is selected and is pasted from plural two-dimensional images having different sight line directions displayed in a part of the screen. The combined images viewed from plural directions can be generated and displayed side by side on the common display screen, or can be displayed sequentially.

FIG. 3A shows a whole body of a human facing the front. In this figure, since the body faces the front, the two-dimensional image of the face that faces the front is selected and is combined with the two-dimensional image of the body facing the front. In this case, the axis of the two-dimensional image of the body and the axis of the two-dimensional image of the face are located at the center of each image. Therefore, the combined two-dimensional image can be generated normally by combining the two images without shifting the center axes of the images by automatically recognizing them.

FIG. 3B shows a whole body of a human facing the left. In this figure, since the body faces the left, the two-dimensional image of the face that faces the left is selected and is combined with the two-dimensional image of the body facing the left. In this case, the axis of the two-dimensional image of the body is located substantially at the center of the image, while the axis of the two-dimensional image of the face is shifted to the right from the center of the image. Therefore, the combined two-dimensional image can be generated normal by shifting the two-dimensional image of the face to the left and combining it with the image of the body.

In this case, the shift of the two-dimensional image of the face with respect to the two-dimensional image of the body can be set manually by an operator with displaying the images visually, or can be derived by a calculation.

In addition, a common three-dimensional shape model of the body can be adopted and plural sets of two-dimensional image of the face can be prepared by shooting plural faces in advance, so that the image of the whole body of each human can be displayed visually and instantly. In this case, since the two-dimensional image is prepared instead of the three-dimensional image even if there is very fine part such as hairs, necessary data quantity can be reduced and the process for constructing the image can be simplified. In addition, even if it is very difficult or impossible to construct the three-dimensional shape of the object, the object can be displayed as if a three-dimensional image is displayed by using the two-dimensional image.

FIG. 4 shows a configuration of a computer system that performs the method of the present invention for displaying the image in accordance with a program stored in a recording medium. The recording medium 41 can be a CD-ROM disk, a flexible disk, an MO disk or other removable disk. The program stored in the recording medium 41 is read out by a reader 42a of a computer 42 and is loaded to a main memory 42b of the computer 42 for execution directly or via an auxiliary storage such as a hard drive. As shown in FIG. 4, the program can be downloaded from a storage device 43 of a server via a network 44, too.

According to the present invention, only the shape of the first part of the object is modeled in the three-dimensional space, and a combined two-dimensional image is assigned to the three-dimensional shape model, so that the high quality display of the object can be attained. Even if the three-dimensional shape model is simplified, the object can be displayed with high quality by making the two-dimensional image with high quality, and the process for generating data can be simplified. Even if the object is difficult to make the three-dimensional shape by the present technology, it can be easily three-dimensionalized.

In addition, since the complex object having a lot of potential data quantity of the three-dimensional shape can be displayed by using the three-dimensional shape model indicating the shape and the two-dimensional image, the data quantity can be substantially reduced with little deterioration of quality.

Therefore, a fitting simulation with realism can be realized easily by constructing the three-dimensional data of the prepared data of the body wearing a cloth selected by a customer and by combining the three-dimensional data with two-dimensional data of the head of the customer obtained by shooting the customer. Furthermore, the present invention can be applied widely to other simulation tools for confirming texture or appearance of a design by changing the combination of parts.

What is claimed is:

1. A method for displaying an image of an object including a first part and a second part, the method comprising:
   constructing a three-dimensional shape model by modeling a shape of the first part of the object in a virtual three-dimensional space;
   setting a view line direction toward the first part;
   constructing a two-dimensional image of the first part of the object when viewing the object from a predetermined direction by displaying the three-dimensional shape model after being rotated in accordance with the set view line direction and by adapting the three-dimensional shape model to a projected shape on a two-dimensional plane;
   constructing a two-dimensional image of the second part of the object when viewing the object from the predetermined direction by obtaining an image of the second part stored in relationship with the set view line direction from two-dimensional images of the second part of the object that were shot from plural directions and were stored in relationship with the plural directions in advance;
   combining the two-dimensional image of the first part with the two-dimensional image of the second part with aligning the axis of a two-dimensional image of the first part and the axis of a two-dimensional image of the second part so as to generate a combined two-dimensional image of the first and the second parts; and
   assigning the combined two-dimensional image to the three-dimensional shape model by assigning a first part image of the combined two-dimensional image to a plane including points of the three-dimensional shape model at a predetermined direction side.

2. The method according to claim 1, further comprising a displaying operation of generating a plurality of combined two-dimensional images of the first and the second parts of the object from a plurality of directions in accordance with designation of direction designating means for designating the predetermined direction, and displaying one of the plural combined two-dimensional images selectively.

3. The method according to claim 2, wherein the displaying step includes an operation of displaying the plural combined two-dimensional images sequentially and continuously.

4. An apparatus for displaying an image of an object including a first part and a second part, the apparatus comprising:
   means for constructing a three-dimensional shape model by modeling a shape of the first part of the object in a virtual three-dimensional space;
   means for setting a view line direction toward the first part;
   means for constructing a two-dimensional image of the first part of the object when viewing the object from a predetermined direction by displaying the three-dimensional shape model after being rotated in accordance with the set view line direction and by adapting the three-dimensional shape model to a projected shape on a two-dimensional plane;
   means for constructing a two-dimensional image of the second part of the object when viewing the object from the predetermined direction by obtaining an image of the second part stored in relationship with the set view line direction from two-dimensional images of the second part of the object shot from plural directions and were stored in relationship with the plural directions in advance;
   means for combining the two-dimensional image of the first part with the two-dimensional image of the second part with aligning the axis of a two-dimensional image of the first part and the axis of a two-dimensional image of the second part so as to generate a combined two-dimensional image of the first and the second parts; and
   means for assigning the combined two-dimensional image to the three-dimensional shape model by assigning a first part image of the combined two-dimensional image to a plane including points of the three-dimensional shape model at a predetermined direction side.

5. The apparatus according to claim 4, further comprising direction designating means for designating the predetermined direction, and displaying means for generating a plurality of combined two-dimensional images of the first and the second parts of the object from a plurality of directions in accordance with designation of the direction designating means and displaying one of the plural combined two-dimensional images selectively.

6. The apparatus according to claim 5, wherein the displaying means display the plural combined two-dimensional images sequentially and continuously.

7. A computer-readable recording medium storing a program for a computer to perform:

constructing a three-dimensional shape model by modeling a shape of a first part of the object in a virtual three-dimensional space;

setting a view line direction toward the first part;

constructing a two-dimensional image of the first part of the object when viewing the object from a predetermined direction by displaying the three-dimensional shape model after being rotated in accordance with the set view line direction and by adapting the three-dimensional shape model to a projected shape on a two-dimensional plane;

constructing a two-dimensional image of a second part of the object when viewing the object from the predetermined direction by obtaining an image of the second part stored in relationship with the set view line direction from two-dimensional images of the second part of the object shot from plural directions and were stored in relationship with the plural directions in advance;

combining the two-dimensional image of the first part with the two-dimensional image of the second part with aligning the axis of a two-dimensional image of the first part and the axis of a two-dimensional image of the second part so as to generate a combined two-dimensional image of the first and the second parts; and assigning the combined two-dimensional image to the three-dimensional shape model by assigning a first part image of the combined two-dimensional image to a plane including points of the three-dimensional shape model at a predetermined direction side.

8. A method for displaying a computer simulation image, comprising:

displaying a three-dimensional shape on a display screen, the three-dimensional shape being based on memorized three-dimensional data corresponding to a human body under neck;

setting a direction in which the three-dimensional shape is displayed;

generating a two-dimensional image of a cloth that is pasted to an image of the human body under neck in accordance with the set direction in which the three-dimensional shape is displayed;

displaying a two-dimensional image of a head portrait on a display screen by obtaining photograph data of the head portrait shot as a real picture image and were stored in advance in accordance with the set direction in which the three-dimensional shape is displayed; and combining the three-dimensional shape of the body under neck with the two-dimensional image of the cloth and the two-dimensional image of the head portrait so as to display a whole body of the human.

9. A method, comprising:

rotating a 3-dimensionally modeled first part according to a direction;

using the direction to select a second part image from a plurality of second part images taken at a plurality of angles; and displaying a combination of the rotated first part and the selected second part image, and wherein the first part comprises a body and the second part comprises a head.

10. A computer readable storage, controlling a computer by, rotating a 3-dimensionally modeled first part according to a direction;

using the direction to select a second part image from a plurality of second part images taken at a plurality of angles; and displaying a combination of the rotated first part and the selected second part image, and wherein the first part comprises a body and the second part comprises a head.

11. An apparatus, comprising:

a storage unit storing a plurality of second part images taken at a plurality of angles; and a processing unit performing:

rotating a 3-dimensionally modeled first part according to a direction;

using the direction to select a second part image from the storage unit;

combining the rotated first part and the selected second part image, and wherein the first part comprises a body and the second part comprises a head.

* * * * *